United States Patent
Mayer et al.

(10) Patent No.: US 11,435,270 B2
(45) Date of Patent: Sep. 6, 2022

(54) HARDNESS TESTERS HAVING A PIVOTING BODY AND CAPABLE OF PROVIDING POWER TO ACCESSORIES ON THE PIVOTING BODY

(71) Applicant: Illinois Tool Works Inc., Glenview, IL (US)

(72) Inventors: Rudolf Mathias Mayer, Esslingen am Neckar (DE); Markus Mueller, Esslingen am Neckar (DE); Roland Schaefer, Gurnee, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 44 days.

(21) Appl. No.: 16/391,955

(22) Filed: Apr. 23, 2019

(65) Prior Publication Data

US 2019/0323931 A1 Oct. 24, 2019

Related U.S. Application Data

(60) Provisional application No. 62/661,615, filed on Apr. 23, 2018.

(51) Int. Cl.
    *G01N 3/02* (2006.01)
    *G01N 3/42* (2006.01)
    (Continued)

(52) U.S. Cl.
    CPC .............. *G01N 3/02* (2013.01); *G01N 3/42* (2013.01); *H01R 13/2478* (2013.01);
    (Continued)

(58) Field of Classification Search
    CPC .... G01N 3/42; G01N 2203/0098; G01N 3/56; G01N 19/00; G01N 3/068; G01N 3/46; G01N 2203/0647
    See application file for complete search history.

(56) References Cited

U.S. PATENT DOCUMENTS

| 4,515,439 A | 5/1985 | Esswein |
| 4,545,439 A | 10/1985 | Sellett |
| 2011/0013275 A1* | 1/2011 | Hein ..................... G02B 21/248 |
| | | 359/388 |

FOREIGN PATENT DOCUMENTS

| DE | 102011013762 A1 * | 9/2011 | ............... G01N 3/04 |
| GB | 2525857 | 11/2015 | |
| JP | H1090151 | 4/1998 | |

OTHER PUBLICATIONS

Int'l Search Report and Written Opinion Appln No. PCT/US2019/028698 dated Aug. 16, 2019 (13 pgs.).

(Continued)

*Primary Examiner* — Brandi N Hopkins
(74) *Attorney, Agent, or Firm* — McAndrews Held & Malloy, Ltd.

(57) ABSTRACT

Hardness testers having a pivoting body and capable of providing power to accessories on the pivoting body are disclosed. An example hardness testing device includes: a rotating carriage configured to: hold at least one of an indenter or an objective and at least one accessory; and rotate to selectively place the at least one indenter or objective or the at least one accessory in an operative position to operate the at least one indenter or objective or the at least one accessory; a carriage mount configured to support the rotating carriage; and an electrical contact block mounted stationary with respect to the carriage mount, the electrical contact block comprising a plurality of electrical contacts configured to make electrical contact with a counterpart electrical contact block of the at least one accessory coupled to the rotating carriage when the at least one accessory is positioned in the operative position.

14 Claims, 7 Drawing Sheets

(51) Int. Cl.
*G02B 21/24* (2006.01)
*H01R 13/24* (2006.01)
*H01R 13/42* (2006.01)

(52) U.S. Cl.
CPC ..... *H01R 13/42* (2013.01); *G01N 2203/0078* (2013.01); *G01N 2203/0206* (2013.01)

(56) References Cited

OTHER PUBLICATIONS

Duravision G5 Brochure, EmcoTest, Oct. 2017.
DuaVision G5 macro and low load hardness tester, https://www.youtube.com/watch?v=Ru8tndNjgMs, Sep. 25, 2017.

* cited by examiner

HARDNESS TESTERS HAVING A PIVOTING BODY AND CAPABLE OF PROVIDING POWER TO ACCESSORIES ON THE PIVOTING BODY

RELATED APPLICATIONS

This patent claims priority to U.S. Provisional Patent Application Ser. No. 62/661,615, filed Apr. 23, 2018, entitled "Hardness Testers Having a Pivoting Body and Capable of Providing Power to Accessories on the Pivoting Body." The entirety of U.S. Provisional Patent Application Ser. No. 62/661,615 is incorporated herein by reference.

FIELD OF THE DISCLOSURE

This disclosure relates generally to hardness testers and, more particularly, to hardness testers having a pivoting body and capable of providing power to accessories on the pivoting body.

BACKGROUND

Conventional hardness testers include selectable objectives or indenters which may be moved into position to perform a given task. Certain accessories and/or other components may require power. Conventional methods to power such accessories involve hard wiring the objective or accessory to a power source, which limits the movement of the objectives or indenters that can be achieved, and the hard wiring can wear out or be disconnected after a large number of movements. Some conventional hardness testers use slip rings to maintain electrical contact with accessories that are subject to moving. However, slip rings are expensive and subject to rapid wear, reducing reliability of power and/or data transfer.

SUMMARY

Hardness testers having a pivoting body and capable of providing power to accessories on the pivoting body are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed example hardness testers include a swiveling carriage configured to: hold a plurality of indenters, objectives, and/or accessories; and swivel to selectively place one of the plurality of indenters, objectives, and/or accessories in a position to operate the one of the plurality of indenters and objectives. The example hardness testers further include a carriage mount configured to support the swiveling carriage, in which the swiveling carriage is configured to swivel with respect to the carriage mount. The hardness testers also include an electrical contact block attached to the carriage mount. The electrical contact block includes a plurality of electrical contacts configured to make electrical contact with a counterpart electrical contact block of at least one accessory coupled to an objective when the at least one objective or the at least one accessory is positioned in an operative position.

Disclosed examples improve the serviceability, reduces the size, and/or reduces the complexity of hardness testers by providing flexible and reliable electrical contact. The disclosed example hardness testers enable continuous rotation of the carriage carrying a combination of indenters, objectives, accessories, and/or other devices while being able to provide power and/or data communications with operative accessories, load cells, and/or other devices. The disclosed example hardness testers provide power and/or data connections without hard wiring the power and/or data connections (i.e., without a continuous hard wired connection between the source and receiver of power or data).

As used herein, the term "accessory" refers to any electrically operated component configured to be used on a hardness testing device, either alone or in conjunction with another device. Accessories may be controlled (e.g., closed loop or open loop control) or uncontrolled. Example accessories that may receive power and/or exchange data using the electrical contact block may include LED-based illuminators, alignment lasers, laser illuminators, general illuminators, load cells, piezoelectric drives, motors (e.g., DC motors), and/or incremental measurement systems.

Disclosed example hardness testing devices include: a rotating carriage configured to: hold at least one of an indenter or an objective and at least one accessory; and rotate to selectively place the at least one indenter or objective or the at least one accessory in an operative position to operate the at least one indenter or objective or the at least one accessory; a carriage mount configured to support the rotating carriage, the rotating carriage configured to rotate with respect to the carriage mount; and an electrical contact block mounted stationary with respect to the carriage mount, the electrical contact block including a plurality of electrical contacts configured to make electrical contact with a counterpart electrical contact block of the at least one accessory coupled to the rotating carriage when the at least one accessory is positioned in the operative position.

In some example hardness testing devices, the plurality of electrical contacts include a plurality of electrically conductive ball and spring plungers. In some examples, the plurality of electrical contacts are coupled to the electrical contact block via respective nuts. In some examples, the plurality of electrical contacts comprise terminal connectors coupled to the ball and spring plungers.

In some example hardness testing devices, at least two of the plurality of electrical contacts are offset over a surface of the electrical contact block. In some examples, a first one of the at least two of the plurality of electrical contacts is coupled to a first voltage source having a first voltage, and a second one of the plurality of electrical contacts is coupled to a second voltage source having a second voltage. In some examples, the at least one accessory includes: a first accessory coupled to a first location on the rotating carriage, the first accessory having at least two electrical contacts positioned to make contact with counterpart ones of the plurality of electrical contacts on the electrical contact block including at least a first one of the offset electrical contacts; and a second accessory coupled to a second location on the rotating carriage, the second accessory having at least two electrical contacts positioned to make contact with counterpart ones of the plurality of electrical contacts on the electrical contact block including at least a second one of the offset electrical contacts.

In some examples, the at least one accessory comprises at least one of: an LED illuminator, a laser, general illumination, a load cell, a piezoelectric drive, a motor, or an incremental measurement system. In some examples, the rotating carriage is configured to perform a hardness test using at least one indenter coupled to the rotating carriage when the indenter is in the operative position. In some examples, the operative position is located between a machine table and a rotational axis of the rotating carriage.

Some example hardness testing devices further include: feedback circuitry configured to output a signal representative of a position of the rotating carriage; and control circuitry configured to determine a position of the indenter, the objective, or the at least one accessory based on the signal. In some examples, at least one of the at least one indenter or objective, or the at least one accessory, is removable from the rotating carriage.

In some examples, the rotating carriage is configured to rotate around a rotational axis, the rotational axis being perpendicular to a direction of displacement of the rotating carriage by the carriage mount. Some example hardness testing devices further include control circuitry, in which at least two of the plurality of electrical contacts of the electrical contact block are configured to transmit at least one of data or a pulse width modulation (PWM) signal from the at least one accessory to the control circuitry. In some examples, the electrical contact block is stationary with respect to the carriage mount, and rotation of the rotating carriage causes the plurality of indenters and objectives to move with respect to the electrical contact block such that rotation of the rotating carriage causes the at least one accessory to move into contact and out of contact with the electrical contacts of the electrical contact block.

Figure 1:
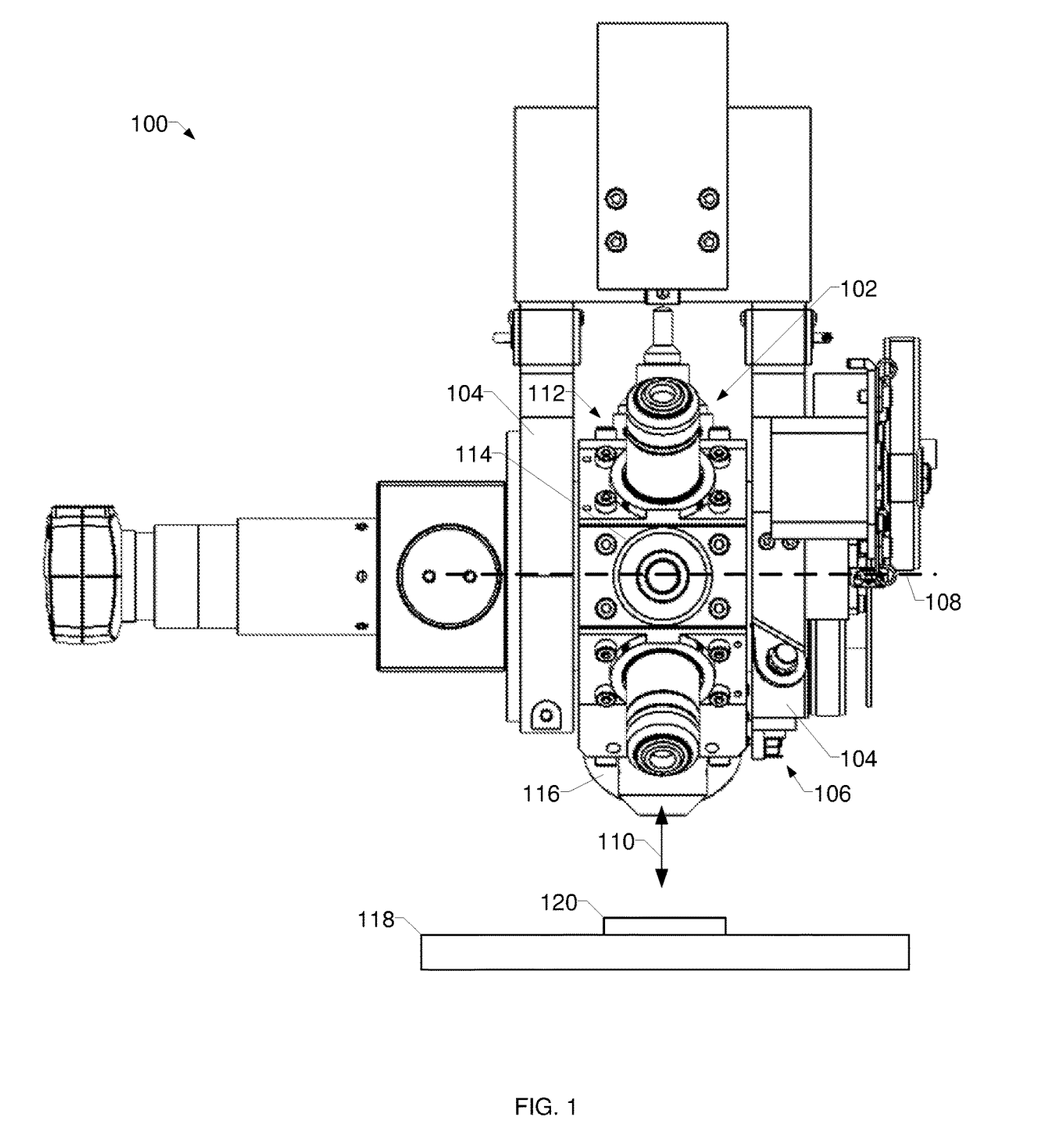
FIG. 1 is an elevation view of an example carriage, an example carriage mount, and an example electrical contact block for a hardness tester, in accordance with aspects of this disclosure.
Figure 2:
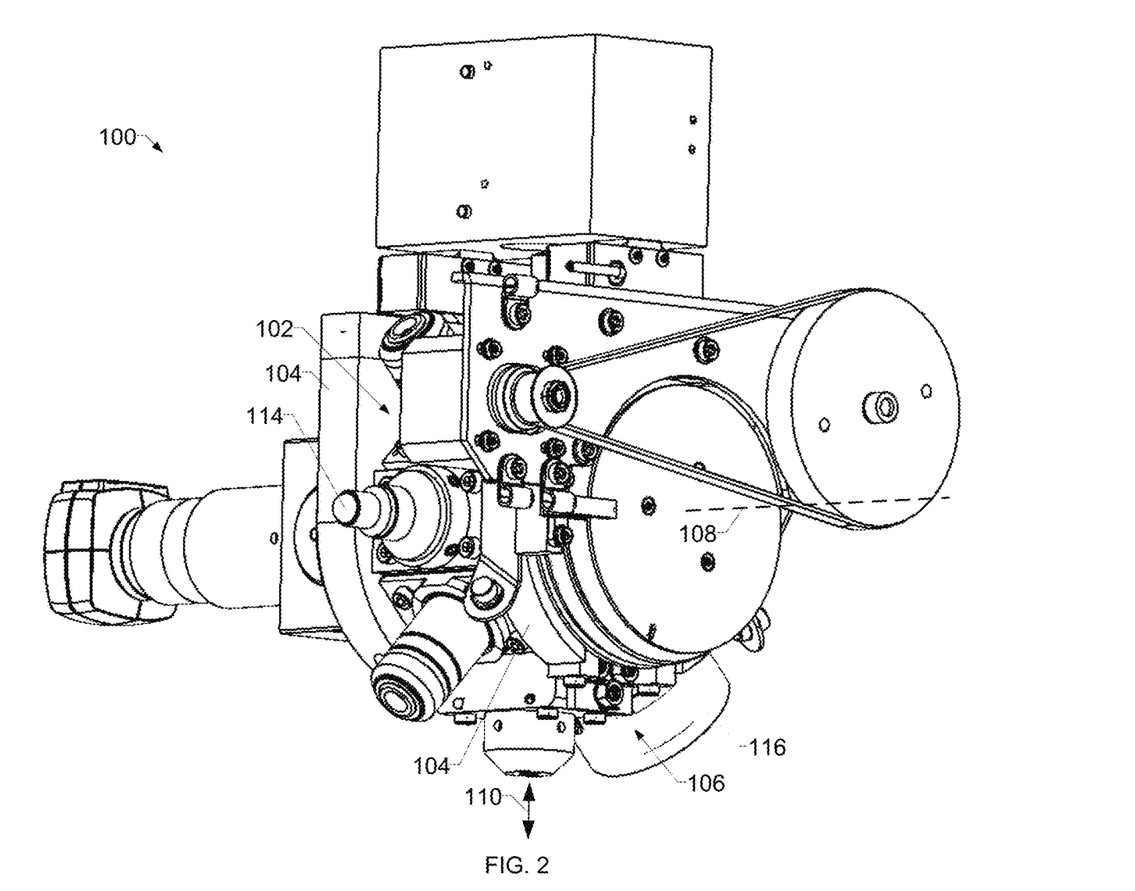
FIG. 2 is a perspective view of the carriage, carriage mount, and electrical contact block of FIG. 1.

FIG. 1 is an elevation view of an example carriage 102, an example carriage mount 104, and an example electrical contact block 106 for a hardness tester 100. FIG. 2 is a perspective view of the carriage 102, carriage mounts 104, and the electrical contact block 106 of FIG. 1. The carriage 102, the carriage mount 104, and the electrical contact block 106 may be used to hold interchangeable indenters, lenses, illuminators, and/or other types of objectives and/or accessories.

The carriage 102 is configured to rotate (or swivel or pivot) about a carriage rotation axis 108 that is transverse to a direction of displacement 110 of the carriage 102. The example carriage 102 is able to accommodate a large number of holders having indenters, lenses, and/or other objectives and/or accessories, and enables exact, reproducible test results in multiple rotational positions.

The hardness tester 100 is constructed as a vertical testing machine, in which the carriage 102 is held on one or more vertical carriage mounts 104. The carriage 102 may be located directly above a machine table 118 configured to receive a specimen 120 to be tested. The example hardness tester 100 enables hardness tests according to the Brinell, Vickers, Rockwell, Super Rockwell, Knoop, Vickers depth measurement, ball pressure hardness, and/or Martens hardness test methods. The carriage 102 is guided vertically by the carriage mounts 104, and may be acted on with the respective test force in the test direction (e.g., vertically).

The carriage 102 acts as a carrier of one or more objectives 112, indenters 114, and/or accessories. In some examples, the carriage 102 includes holders at different circumferential positions around the carriage 102. The objectives 112, indenters 114, and/or accessories can be interchangeably attached to the holders. Additionally or alternatively, the objectives 112, indenters 114, and/or accessories may be detachable or permanently attached to the carriage 102 via the holders.

The carriage 102 may be rotated about the rotational axis 108 by a motor, such as a stepper motor. The motor may include a rotary encoder, and is controllable via a microcontroller or other control circuitry. The carriage 102 is disposed between the carriage mounts 104 on both sides and mounted via bearings in the carriage mounts 104 about the rotational axis 108. In some other examples, the carriage 102 is mounted to a single carriage mount 104 via one or more bearings. The motor may be mounted on one of the carriage mounts 104 to pivot the carriage 102, such as by deflecting discs and a drive belt.

The carriage 102 and/or the carriage mounts 104 may be acted on in a vertical direction to drive an indenter 114 in the direction of displacement 110 (e.g., vertically), such as to perform an indentation on a specimen. For example, the carriage mounts 104 (and, thus, the carriage 102) is driven by a rotatably driven spindle in the axial direction of the spindle, which is identical to the direction of displacement 110. An example spindle may include a ball screw. By controlling and monitoring displacement of the carriage mounts 104 and the carriage 102, the test force can be controlled (e.g., by control circuitry). The control circuitry may monitor the exact alignment of the carriage 102 and/or the indenter 114, which has been positioned in a test position by a rotational operation of the carriage 102 (e.g., via the motor) and monitoring the position of the indenter 114 via a rotary encoder, monitoring step counts of the motor, and/or any other incremental monitoring system, sensor (e.g., a Hall effect sensor), and/or feedback circuitry.

To detect and/or control divergence of the carriage 102 and/or the indenter 114 from a desired test position, the carriage mounts 104 may include load cells. The load cells may have strain gauges for detection. A monitoring device (e.g., control circuitry) receives output signals from the load cells, such that the motor of the carriage 102 is controlled in response to these output signals to maintain the carriage 102 and/or the indenter 114 in a correct position and/or orientation for testing. The load cells reduce or eliminate hardness testing errors and improve (e.g., ensure) compliance with hardness testing standards, including both depth measurements and optical measuring methods.

The carriage 102 may include other objectives and/or accessories, such as a light source 116 associated with optics attached to the carriage 102. For example, the light source 116 may include LED illumination and an associated deflecting mirror. In some examples, the light source 116 is a ringlight, in which a mirrored light beam of the light source 116 and/or an object beam impinge on the semitransparent mirror that lies on a common axis corresponding to the axis of the objective. The axis is directed approximately at right angles to the rotational axis 108 of the carriage 102. The optics and the light source 116 are fixedly and rigidly arranged in relation to each other in an interior of the carriage 102. The image of the inspection is captured by a camera (e.g., a digital image sensor) via the semi-transparent mirror and a camera lens (e.g., the optics).

The light source 116 requires a source of power to provide the illumination. The electrical contact block 106 enables connection and disconnection of the light source 116 to a power source. In particular, the example light source 116 may be connected to the electrical contact block 106 when the light source 116 and the objective are positioned (e.g., by rotating the carriage 102 about the rotational axis 108) in an operative position (e.g., aligned with the direction of displacement) in which the objective and the light source 116 are to be used to capture an image. When the carriage 102 rotates the light source 116 out of the operative position, contact between the light source 116 and the electrical contact block 106 is broken.

The electrical contact block 106 is attached to one of the carriage mounts 104, so that the electrical contact block 106 is stationary and the accessories and/or other components attached to the carriage 102 may be rotated into and out of contact with the electrical contact block 106. The electrical contact block 106 may be used to transfer power and/or data with accessories. Accessories that are to make contact with the electrical contact block 106 for power and/or data transmission have a counterpart electrical contact block. In some examples, the terminals 1210 and the electrical contact block 106 enable communication with multiple, different load cells associated with corresponding indenters attached to the carriage 102.

While the example hardness tester 100 of FIG. 1 is described as having the rotational axis 108 transverse to the direction of displacement 110 (e.g., the axis is horizontal), in other examples the carriage 102 may be configured to rotate about an axis that is parallel to the direction of displacement 110 (e.g., a vertical axis) and/or at an angle relative to the direction of displacement 110 (e.g., 45 degrees, 60 degrees, etc.). In such examples, the objectives, indenters, accessories, and/or other devices are attached to the carriage at an appropriate angle to effect hardness testing, and the electrical contact block 106 is positioned on a stationary surface so as to make electrical contact with an accessory in an operative position.

Figure 3:
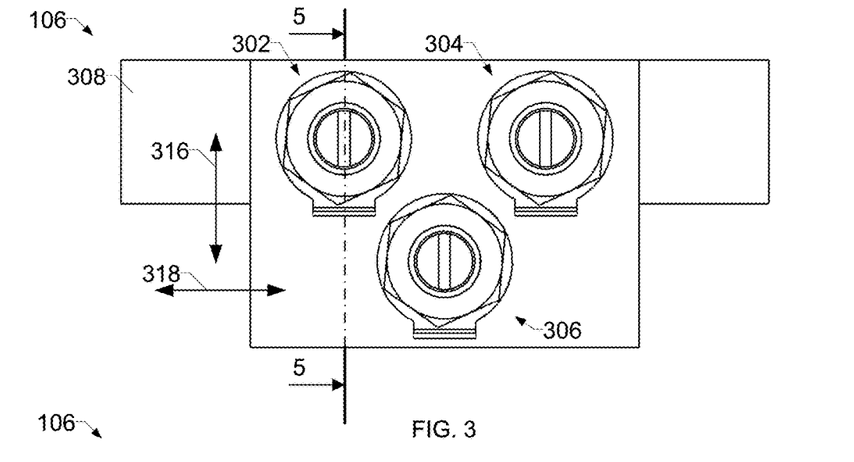
FIG. 3 is an elevation view of an example implementation of the electrical contact block of FIG. 1, in accordance with aspects of this disclosure.
Figure 4:
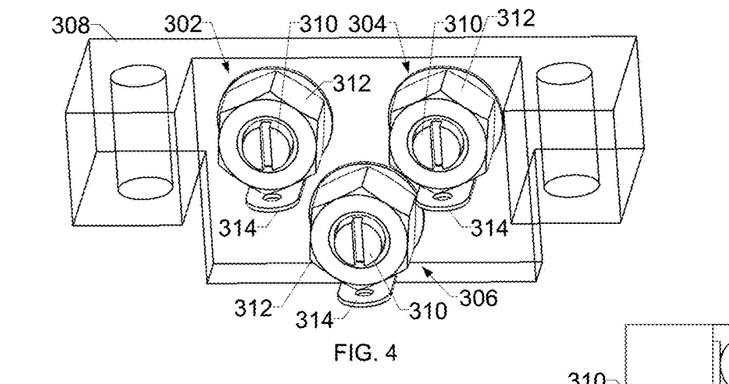
FIG. 4 is a perspective view of the electrical contact block of FIG. 3.
Figure 5:
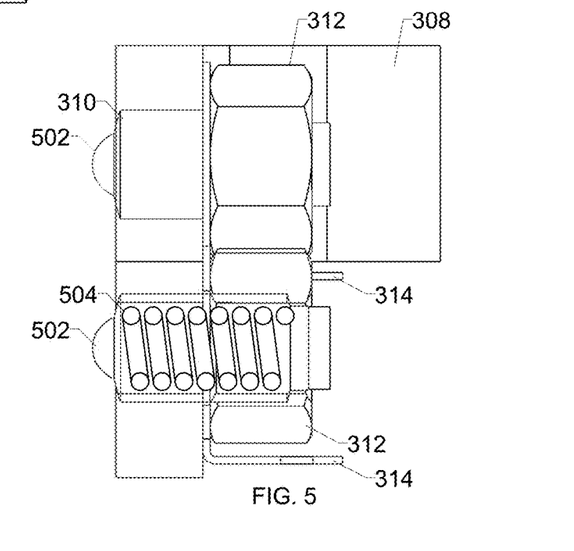
FIG. 5 is a cross-section side view of the electrical contact block of FIG. 3.

FIG. 3 is an elevation view of an example implementation of the electrical contact block 106 of FIG. 1. FIG. 4 is a perspective view of the electrical contact block 106 of FIG. 3. FIG. 5 is a cross-section side view of the electrical contact block of FIG. 3. As illustrated in FIG. 3, the electrical contact block 106 includes multiple electrical contacts 302, 304, 306 mounted to a mounting block 308. The mounting block 308 attaches or mounts the electrical contact block 106 to the carriage mount 104. While three example contacts 302-306 are shown in FIG. 3, the electrical contact block 106 may include more or fewer electrical contacts to provide power and/or data.

Each of the example electrical contacts 302-306 includes a ball and spring plunger 310, a nut 312, and a ring terminal 314. The nut 312 couples the ring terminal 314 and the ball and spring plunger 310 to the mounting block 308. The ball and spring plunger 310 is biased toward contact with the electrical contact block of an accessory. The ring terminal 314, or other terminal connector, is electrically coupled to the ball and spring plunger 310, and may be coupled to a desired power and/or data connection. As illustrated in FIG. 5, a spring 502 in each of the ball and spring plungers 310 biases a ball 504 toward a contact position to ensure adequate electrical contact. The ball and spring plunger 310 may be adjusted to increase or decrease the bias force.

In some examples, the electrical contacts 302-306 correspond to multiple voltages that can be provided to power one or more accessories. Different accessories can include electrical contacts to be coupled to some, none, or all of the available electrical contacts on the electrical contact block 106. For example, a first voltage source may be coupled to provide a first voltage across the electrical contacts 302, 304, and a second voltage source may be coupled to provide a second voltage across the electrical contacts 302, 306. A first accessory (e.g., the light source 116) may include two terminals to make contact with the electrical contacts 302 and 304, while a second accessory (e.g., a laser) may include two terminals to make contact with a different set of the electrical contacts 302 and 306.

To avoid applying excess voltage to an accessory, two or more of the electrical contacts 302-306 may be offset. For example, the electrical contact 306 is offset from both of the electrical contacts 302-306 in a direction 316 transverse to a travel direction 318 of the accessory.

The voltage(s) supplied via the electrical contacts 302-306 may be controlled (e.g., by control circuitry and/or a power source). For example, one or more voltage(s) may be increased and/or reduced to control illumination output by an LED. The voltage(s) may be controlled via a pulse width modulated (PWM) signal and/or by directly controlling the output voltage (e.g., DC voltage level, AC voltage amplitude, etc.).

Figure 6:
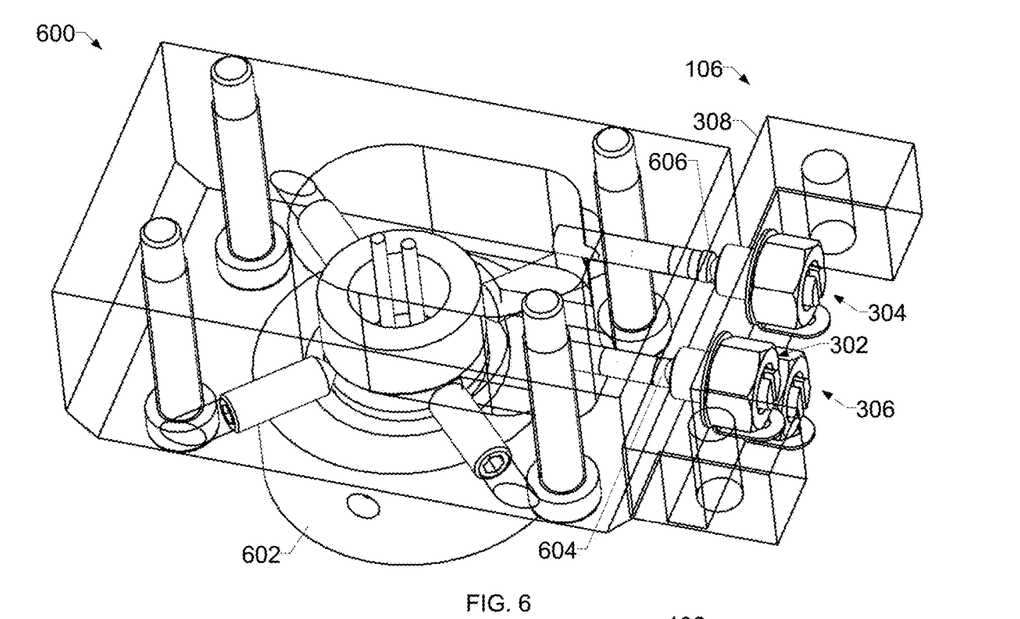
FIG. 6 is a perspective view of an example objective including a laser, positioned in electrically contact with the electrical contact block of FIG. 3, in accordance with aspects of this disclosure.
Figure 7:
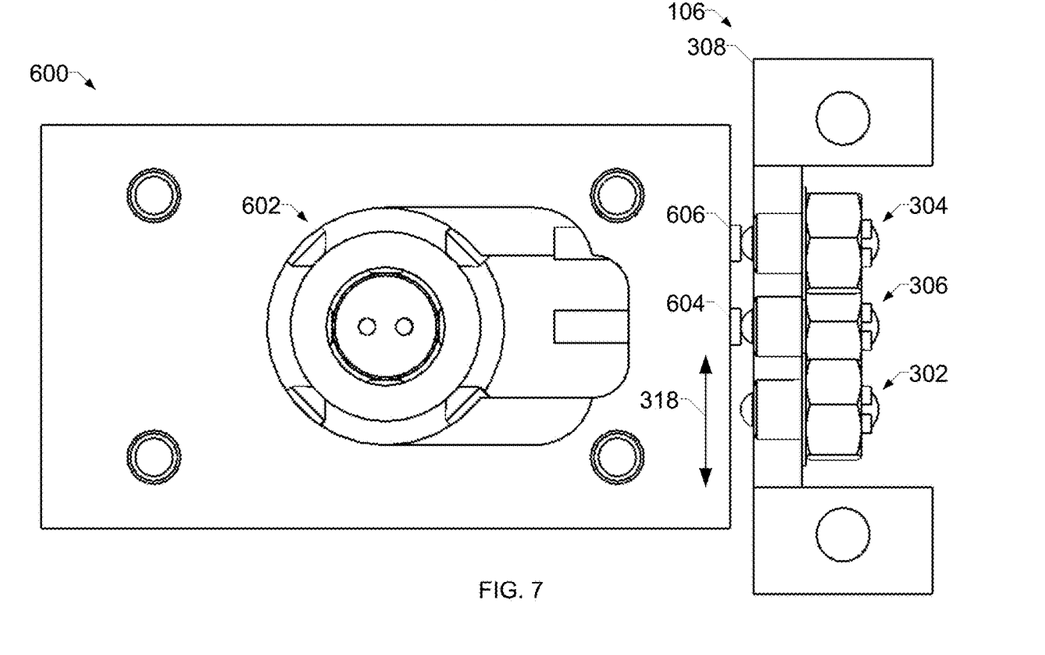
FIG. 7 is a plan view of the example objective and the electrical contact block of FIG. 6.
Figure 8:
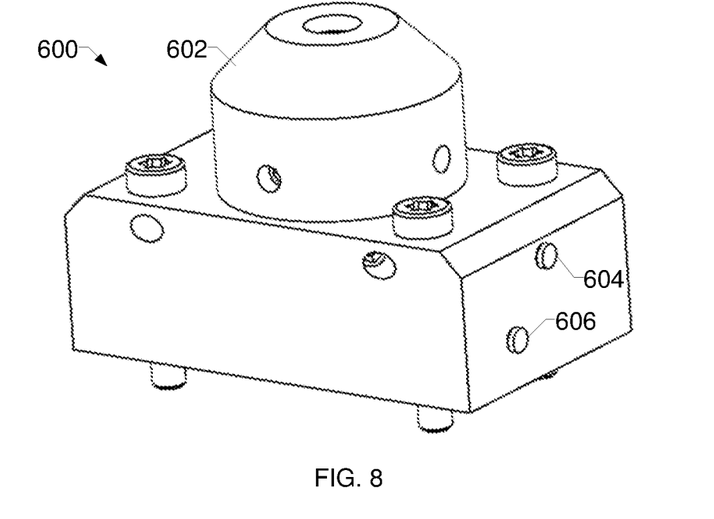
FIG. 8 is a perspective view of the example objective of FIG. 6 including contact terminals configured to make contact with the electrical contact block.
Figure 9:
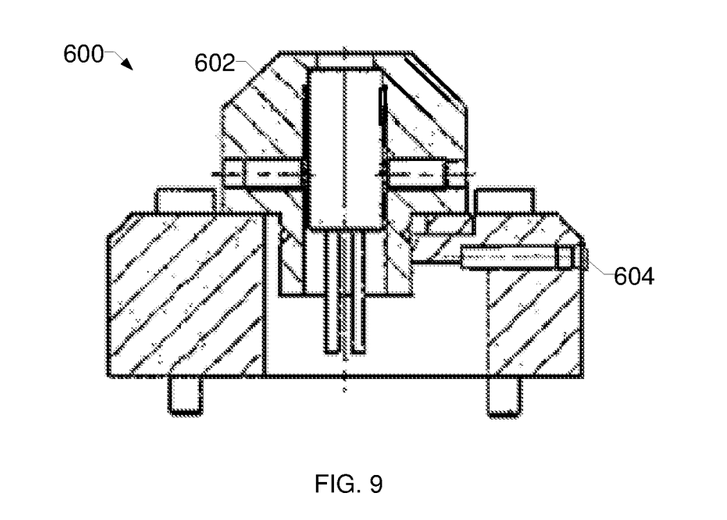
FIG. 9 is a cross-sectional view of the objective of FIG. 6.

FIG. 6 is a perspective view of an example accessory 600 including a laser 602, positioned in electrically contact with the electrical contact block 106 of FIG. 3. FIG. 7 is a plan view of the example accessory 600 and the electrical contact block of FIG. 6. FIG. 8 is a perspective view of the example accessory 600 of FIG. 6, including the contact terminals 604, 606 configured to make contact with the electrical contact block 106. FIG. 9 is a cross-sectional view of the accessory 600 of FIG. 6. The electrical contact block 106 may provide power to the accessory 600, including the laser 602, when the accessory 600 is positioned the carriage 102 at the designated position.

To make contact with the electrical contact block 106, the example accessory 600 includes terminals 604, 606, which are aligned to make contact with the electrical contacts 304, 306 of the electrical contact block 106. As the accessory 600 is moved into position by rotation of the carriage 102, the terminals 604, 606 are moved into alignment with the electrical contacts 304, 306. The ball and spring plungers 310 of the electrical contacts 304, 306 are biased toward the accessory 600. When the carriage 102 is rotated such that the accessory 600 is in an operative position, the ball and spring plungers 310 are biased into contact with the terminals 604, 606.

Additionally or alternatively, the hardness tester 100 may include circuitry that configures the power and/or data provided to the electrical contacts based on, for example, the type of accessory that is to be coupled to the electrical contacts. Accessories may then have substantially identical arrangements of the terminals 604, 606 to connect to the same electrical contacts 302-306. The circuitry may, for example, connect the electrical contacts 302, 304 to a first voltage source to provide a first voltage for a first accessory (or control the voltage source to provide a first voltage). The circuitry may then connect the electrical contacts 302, 304 to a second voltage source (or control the voltage source) to provide a second voltage for a second accessory.

Figure 10:
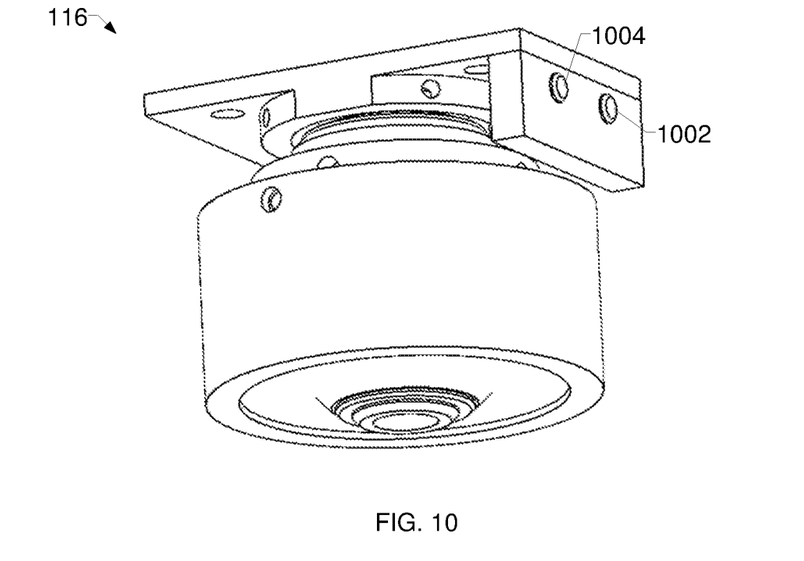
FIG. 10 is a perspective view of the example accessory, including contact terminals configured to make contact with the electrical contact block of FIG. 3, in accordance with aspects of this disclosure.
Figure 11:
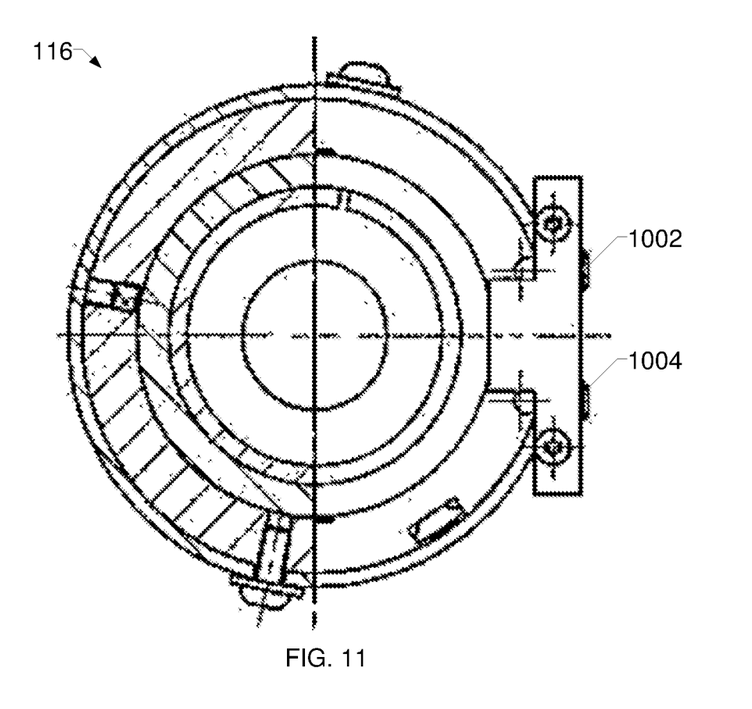
FIG. 11 is a cross-sectional plan view of the objective of FIG. 6.
Figure 12A:
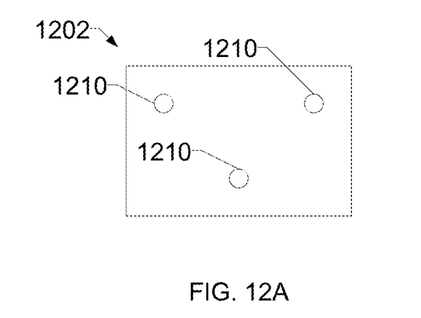
FIGS. 12A-12D illustrate example arrangements of electrical terminals that may be used for accessories to receive power and/or exchange data via a corresponding electrical terminal block.
Figure 12B:
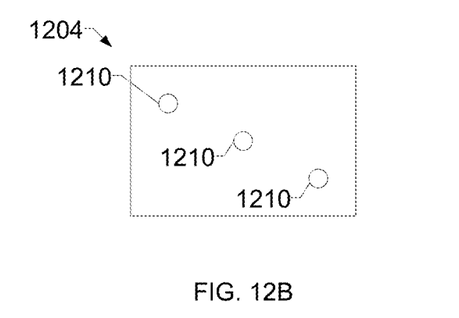
Figure 12C:
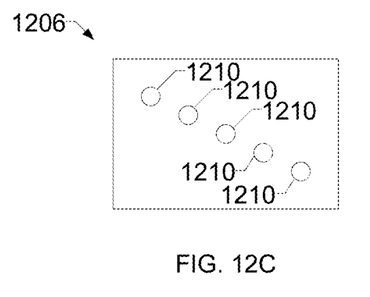
Figure 12D:
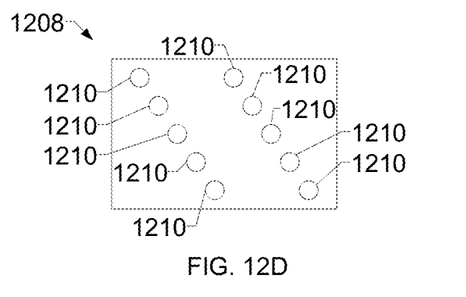

FIG. 10 is a perspective view of the example light source accessory 116 of FIG. 1, including contact terminals 1002, 1004 configured to make contact with the electrical contact block 106 of FIG. 3. FIG. 11 is a cross-sectional plan view of the light source accessory 116 of FIG. 10. In a similar manner as the terminals 604, 606, the terminals 1002, 1004 are aligned to make contact with the electrical contacts 302, 304 when the light source accessory 116 is in an operative position (e.g., by rotation of the carriage 102. The example light source accessory 116 may receive power via the electrical contacts 302, 304, which may provide a different voltage than the combination of electrical contacts 304, 306 to which the light source accessory 116 is configured to make electrical contact.

FIGS. 12A-12D illustrate example electrical terminal blocks 1202-1208 having different arrangements of electrical terminals 1210 that may be used for accessories. The example electrical terminals 1210 may contact corresponding electrical contacts, similar or identical to the electrical contacts 302-306, to receive power and/or exchange data via a corresponding electrical terminal block (e.g., the electrical contact block 106 of FIG. 1).

In some examples, combinations of the terminals 1210 exchange data using serial connections, parallel connections, bus-based connections (e.g., control area network (CAN) bus, PROFIBUS, etc.), differential signaling, pulse width modulation, and/or any other analog or digital signaling. As mentioned above, multiple combinations of two or more terminals 1210 may provide different supply voltages, which can be accessed by accessories having electrical terminals 1210 arranged to contact the corresponding electrical contacts on the electrical contact block 106.

While the examples above are described with reference to accessories, disclosed examples may also be applied to objectives, indenters, and/or other devices that may be attached to the carriage 102 that may benefit from power and/or data transfer in the future.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A hardness testing device, comprising:
a rotating carriage configured to:
hold at least one of an indenter or an objective and at least one accessory; and
rotate to selectively place the at least one indenter or objective or the at least one accessory in an operative position to operate the at least one indenter or objective or the at least one accessory;
a carriage mount configured to support the rotating carriage, the rotating carriage configured to rotate with respect to the carriage mount; and
an electrical contact block mounted stationary with respect to the carriage mount, the electrical contact block comprising a plurality of electrical contacts configured to make electrical contact with a counterpart electrical contact block of the at least one accessory coupled to the rotating carriage when the at least one accessory is positioned in the operative position, wherein rotation of the rotating carriage causes the at least one indenter or objective to move with respect to the electrical contact block such that rotation of the rotating carriage causes the at least one accessory to move into contact and out of contact with the electrical contacts of the electrical contact block.

2. The hardness testing device as defined in claim 1, wherein the plurality of electrical contacts comprise a plurality of electrically conductive ball and spring plungers.

3. The hardness testing device as defined in claim 2, wherein the plurality of electrical contacts are coupled to the electrical contact block via respective nuts.

4. The hardness testing device as defined in claim 3, wherein the plurality of electrical contacts comprise terminal connectors coupled to the ball and spring plungers.

5. The hardness testing device as defined in claim 1, wherein at least two of the plurality of electrical contacts are offset in one or more directions over a surface of the electrical contact block.

6. The hardness testing device as defined in claim 1, wherein the at least one accessory comprises at least one of: an LED illuminator, a laser, general illumination, a load cell, a piezoelectric drive, a motor, or an incremental measurement system.

7. The hardness testing device as defined in claim 1, wherein the rotating carriage is configured to perform a hardness test using at least one indenter coupled to the rotating carriage when the indenter is in the operative position.

8. The hardness testing device as defined in claim 1, wherein the operative position is located between a machine table and a rotational axis of the rotating carriage.

9. The hardness testing device as defined in claim 1, further comprising:
feedback circuitry configured to output a signal representative of a position of the rotating carriage; and
control circuitry configured to determine a position of the indenter, the objective, or the at least one accessory based on the signal.

10. The hardness testing device as defined in claim 1, wherein at least one of the at least one indenter or objective or the at least one accessory is removable from the rotating carriage.

11. The hardness testing device as defined in claim 1, wherein the rotating carriage is configured to rotate around a rotational axis, the rotational axis being perpendicular to a direction of displacement of the rotating carriage by the carriage mount.

12. A hardness testing device, comprising:
a rotating carriage configured to:
hold at least one of an indenter or an objective and at least one accessory; and
rotate to selectively place the at least one indenter or objective or the at least one accessory in an operative position to operate the at least one indenter or objective or the at least one accessory;
a carriage mount configured to support the rotating carriage, the rotating carriage configured to rotate with respect to the carriage mount; and
an electrical contact block mounted stationary with respect to the carriage mount, the electrical contact block comprising a plurality of electrical contacts configured to make electrical contact with a counterpart electrical contact block of the at least one accessory coupled to the rotating carriage when the at least one accessory is positioned in the operative position, wherein at least two of the plurality of electrical contacts are offset in one or more directions over a surface of the electrical contact block, wherein a first one of the at least two of the plurality of electrical contacts is coupled to a first voltage source having a first voltage, and a second one of the plurality of electrical contacts is coupled to a second voltage source having a second voltage.

13. A hardness testing device, comprising:
a rotating carriage configured to:
hold at least one of an indenter or an objective and at least one accessory; and
rotate to selectively place the at least one indenter or objective or the at least one accessory in an operative position to operate the at least one indenter or objective or the at least one accessory;
a carriage mount configured to support the rotating carriage, the rotating carriage configured to rotate with respect to the carriage mount; and
an electrical contact block mounted stationary with respect to the carriage mount, the electrical contact block comprising a plurality of electrical contacts configured to make electrical contact with a counterpart electrical contact block of the at least one accessory coupled to the rotating carriage when the at least one accessory is positioned in the operative position, wherein at least two of the plurality of electrical contacts are offset in one or more directions over a surface of the electrical contact block, wherein the at least one accessory comprises:
a first accessory coupled to a first location on the rotating carriage, the first accessory comprising at least two electrical contacts positioned to make contact with counterpart ones of the plurality of electrical contacts on the electrical contact block including at least a first one of the offset electrical contacts; and
a second accessory coupled to a second location on the rotating carriage, the second accessory comprising at least two electrical contacts positioned to make contact with counterpart ones of the plurality of electrical contacts on the electrical contact block including at least a second one of the offset electrical contacts.

14. A hardness testing device, comprising:
a rotating carriage configured to:
hold at least one of an indenter or an objective and at least one accessory; and
rotate to selectively place the at least one indenter or objective or the at least one accessory in an operative position to operate the at least one indenter or objective or the at least one accessory;
a carriage mount configured to support the rotating carriage, the rotating carriage configured to rotate with respect to the carriage mount;
an electrical contact block mounted stationary with respect to the carriage mount, the electrical contact block comprising a plurality of electrical contacts configured to make electrical contact with a counterpart electrical contact block of the at least one accessory coupled to the rotating carriage when the at least one accessory is positioned in the operative position; and
control circuitry, wherein at least two of the plurality of electrical contacts of the electrical contact block are configured to transmit at least one of data or a pulse width modulation (PWM) signal from the at least one accessory to the control circuitry.

* * * * *